United States Patent Office 3,787,532
Patented Jan. 22, 1974

3,787,532
POLYPHENYLENE ETHER COMPOSITIONS
Donald D. Carmelite, Slingerland, N.Y., Morton Kramer, Pittsfield, Mass., and Gim F. Lee, Jr., Albany, N.Y., assignors to General Electric Company
No Drawing. Filed Dec. 3, 1971, Ser. No. 204,719
Int. Cl. C08c 9/14; C08d 9/08
U.S. Cl. 260—876 R       17 Claims

ABSTRACT OF THE DISCLOSURE

There are provided high impact strength thermoplastic compositions comprising in combination (a) a polyphenylene ether resin, (b) a polystyrene resin and (c) an interpolymer of 30 to 70 parts by weight of a diene rubber with 70 to 30 parts by weight of (i) a vinyl aromatic compound or (ii) a mixture of a vinyl aromatic compound and an acrylic ester, the compositions having a dispersed elastomeric phase with at least 85% of the number of particles being about 0.5 micron or less in size and less than 15% of the number of particles being greater than about 0.5 micron in size. The compositions provide molded articles with substantial and unexpected improvements in impact resistance—especially at low temperatures—and enhanced surface appearance.

---

This invention relates to thermoplastic resin compositions and, more particularly, to high impact thermoplastic compositions comprising a polyphenylene ether resin, a polystyrene resin and an interpolymer of a diene rubber and a vinyl aromatic compound or a mixture of a vinyl aromatic compound and an acrylic ester. The interpolymer has a rubber content of at least 30 wt. percent. An elastomeric phase is dispersed in the composition in the form of particles, at least 85% of which are 0.5 micron or less in diameter.

BACKGROUND OF THE INVENTION

The polyphenylene ethers are known and described in numerous publications, including Hay, U.S. Pats. 3,306,874 and 3,306,875; and Stamatoff, 3,257,357 and 3,257,358, all incorporated herein by reference. They are useful for many commercial applications requiring high temperature resistance and, because they are thermoplastic, they can be formed into films, fibers and molded articles. In spite of these desirable properties, parts molded from polyphenylene ethers are somewhat brittle due to poor impact strength. In addition, the relatively high melt viscosities and softening points are considered a disadvantage for many uses. Films and fibers can be formed from polyphenylene ethers on a commercial scale using solution techniques, but melt processing is commercially unattractive because of the required high temperatures needed to soften the polymer and the problems associated therewith such as instability and discoloration. Such techniques also require specially designed process equipment to operate at elevated temperatures. Molded articles can be formed by melt processing techniques, but, again, the high temperatures required are undesirable.

It is known in the art that the properties of the polyphenylene ethers can be materially altered by forming compositions with other polymers. For example, Finholt, U.S. Pat. 3,379,792, discloses that flow properties of polyphenylene ethers are improved by preparing a composition thereof with from about 0.1 to 25 parts by weight of a polyamide. In Gowan, U.S. Pat. 3,361,851, polyphenylene ethers are formed into compositions with polyolefins to improve impact strength and resistance to aggressive solvents. In Cizek, U.S. Pat. 3,383,435, incorporated herein by reference, there is provided a means to simultaneously improve the melt processability of the polyphenylene ethers and upgrade many properties of polystyrene resins. The Cizek patent discloses that polyphenylene ethers and polystyrene resins, including many modified polystyrenes, are combinable in all proportions to provide compositions having many properties improved over those of either of the components.

Preferred embodiments of the Cizek patent are compositions comprising (a) either a crystal homopolystyrene or a rubber modified high-impact polystyrene and (b) a poly(2,6-dialkyl-1,4-phenylene)ether. Such compositions are important commercially because they provide both an improvement in the melt processability of the polyphenylene ether and an improvement in the gloss (homopolystyrene) and impact resistance (rubber modified polystyrene) of parts molded from the compositions. Further, such compositions of the polyphenylene ether and the homopolystyrene or the rubber modified high-impact polystyrene may be custom formulated to provide predetermined properties ranging between those of the polystyrene resin and those of the polyphenylene ether by controlling the ratios of the polymers. The reason for this is that the Cizek compositions exhibit a single set of thermodynamic properties rather than the two distinct sets of properties, i.e., one for each of the components of the composition, as is typical with compositions or blends of the prior art.

The compositions disclosed in the Cizek patent comprising crystal homopolystyrene and polyphenylene ether have rather low impact strengths, ranging from about 0.2 to about 1.2 ft. lbs./in. of notch in the Izod test, and they are very brittle at low temperatures, e.g., 0° F., −20° F. and −40° F., limiting their utility in automotive applications, for example.

In the Cizek patent, one composition is disclosed in which 10% by weight of butadiene rubber has been added (Example 9). Impact strength at room temperature is improved markedly, to 5.5 ft. lbs./inch notch, but the surface appearance, i.e., gloss, of the molded article is sacrificed, and the parts are still very brittle at low temperatures.

With respect to impact resistant compositions, the preferred embodiment of the Cizek patent is disclosed to comprise poly-(2,6-dimethyl-1,4-phenylene)ether and a rubber modified high-impact polystyrene (identified in Example 7 as Lustrex HT88-1 of Monsanto Chemical Comapny). It is known in the art that Monsanto HT–88 high impact polystyrene contains about 8 wt. percent of an elastomeric gel phase dispersed through a polystyrene matrix and that the average particle size of the dispersed elastomer ranges from 2 to 10 microns with an average of 4 to 6 microns. A few, smaller size particles, e.g., 0.25 and 0.5 micron can also be present. This is shown, e.g., in the photomicrograph in vol. 19, Encyclopedia of Chemical Technology, 2nd ed., 1969, p. 94, FIG. 2(b). The same photomicrograph shows that within the 0.2 to 10 micron range, the number of particles of below 0.5 micron in size comprises only about 14% of the total, while the number of particles of above 0.5 micron in size comprises about 85% of the total. Such distributions are seen typically in all rubber modified poystyrenes used heretofore to enhance the impact strength of polyphenylene ethers.

Thus in the most preferred embodiment of the Cizek patent, at a rubber content ranging from 1.2 to 6 wt. percent, with the major fraction of the elastomeric particles being above 0.5 micron in size, the notched Izod impact strength ranges from 1.2 to 1.1 ft.-lbs./in. notch with a maximum of about 1.5 at about 4 wt. percent of rubber in the composition. These preferred compositions have a tendency also to lose their impact strengths at low temperatures.

It would be obvious to increase the rubber content of all such compositions to improve their impact strengths. However, it has been found that such an expedient sacrifices other commercially important properties, particularly surface appearance, i.e., gloss, processability, oxidation resistance and the like.

Therefore, to improve impact strengths without raising rubber contents it has been proposed to vary the number, size and character of dispersed elastomeric particles which give the compositions their resistance to impact. For all practical purposes, such compositions can lead to substantially improved impact strengths, in comparison with those described in the Cizek patent, and even at the same rubber levels. However, impact strengths still are lost at low temperatures and if attempts are made to increase the amount of rubber to raise the impact strengths at room temperature still more and/or overcome their loss at low temperatures, the surface appearance, and other properties are adversely affected.

It has now been discovered that if to polyphenylene ether-polystyrene compositions are added diene rubber interpolymers with vinyl aromatic compounds, e.g., styrene or mixtures of styrene with minor amounts of acrylic esters, the interpolymers having—in comparison with the rubber modified polystyrenes used heretofore—a high rubber content and a particle size distribution range heavily weighted on the small end, unexpectedly advantageous properties are obtained. In particular, the impact strengths are high and permit full advantage to be taken of rubber content, unexpectedly without loss in surface appearance and processability. Very unexpectedly also, the impact strengths are substantially superior to what would be expected from data obtained on the individual components alone. In addition, the compositions have substantially superior impact strengths at temperatures even as low as —40° F.

For example, with an interpolymer containing 60% by weight of rubber and 40% of polystyrene and having (in the composition) 95% of the number of particles 0.5 micron or below and only 5% of the number of particles greater than 0.5 micorn, Izod impact strengths of 4–5 ft. lbs./in. notch are obtained with only 9% of rubber in the total composition. The gloss of molded parts is outstanding. At —40° F., the impact strengths are 1.3 to 1.7 times the values of corresponding compositions without the interpolymers.

The results herein are also unexpected in view of the statements in Encyclopedia of Polymer Science and Technology, vol. 13, Interscience, 1970, p. 392. It is stated therein to be generally recognized that there is an optimum particle size in the region of 2–5 microns for impact resistant polystyrene with a relatively narrow size distribution around this range. The use of such a large number of very small particles, the number average particle size being only about 0.25 micron or so, would be expected, in view of this, to diminish impact properties, and not to enhance them as applicants have found.

DESCRIPTION OF THE INVENTION

According to the present invention, in its broadest aspects, there are provided thermoplastic compositions with unexpectedly high impact resistance comprising in combination (a) a polyphenylene ether resin, (b) a polystyrene resin and (c) and interpolymer of from about 30 to 70 parts by weight of a diene rubber with from about 70 to about 30 parts by weight of a vinyl aromatic compound or a mixture of a vinyl aromatic compound and an alkyl acrylic ester, the composition having a dispersed elastomeric phase with particle size of at least about 0.05 micron, from about 85 to 100% of the number of particles being about 0.5 micron or below in size and from 0 to about 15% of the number of particles being greater than about 0.5 micron in size. In general, the compositions according to this invention are prepared by combining said polyphenylene ether and a crystal homopolystyrene or a rubber modified polystyrene containing an elastomeric particel size distribution generally well above that mentioned above, i.e., greater than 15% of the particles being above 0.5 micron in size, with the diene-vinyl aromatic interpolymer to obtain a composition having a discontinuous phase of elastomeric particles contributed by the interpolymer and, if present, the rubber modified polystyrene resin. If the polystyrene component is not rubber modified, the interpolymer alone is selected to provide the particle size distribution recited above. Such compositions may be molded to shape using conventional molding procedures.

Therefore, according to a preferred aspect of this invention, there are provided high impact strength thermoplastic compositions comprising
(a) A polyphenylene ether resin
(b) A polystyrene resin, and
(c) An interpolymer of a diene rubber with styrene or a mixture of styrene and an alkyl acrylate said composition containing from about 5 to about 25% by weight of the interpolymer. In particularly preferred compositions, the composition will contain a dispersed elastomeric phase in which from 90 to 100% of the number of particles are from 0.05 to 0.5 micron in size and from 0 to about 10% of the number of particles are from above 0.5 to 20 microns in size. Other preferred compositions will have from 98 to 100% of the particles in the 0.05 to 0.5 micron range, the balance, 0 to 2% being in the above 0.5 to 20 micron range.

The compositions of this invention consist of a mixture of two phases, the continuous phase being a matrix of polyphenylene ether resin and styrene resin in which there is a discontinuous phase dispersed comprising elastomeric particles. While the interpolymer component always contributes elastomeric particles, the styrene component may do so too—if it is rubber modified. Such elastomeric particles may also include to varying extents polyphenylene ether resins, depending upon how the compositions are prepared. In general, it is preferred that they include a minor proportion, e.g., up to about 50% by weight of ungrafted polystyrene interpolymerized with up to about 33% by weight alkyl acrylate. In a typical elastomer particle derived from either the interpolymer component or from the rubber modified polystyrene resin—if present— there may be, for example, up to about 45% by weight of rubber, about 10% or more by weight of grafted polystyrene and up to about 50% by weight of occluded, ungrafted styrene resin.

The size of the particles in the present compositions can be measured by means well known to those skilled in the art, for example, either by electron microscopy, which is especially convenient, or by micro-filtration, and similar known methods. For general details of the preparation of samples, typical photomicrographs and a discussion of the relationship of particle size to impact strengths, reference is made to the Encyclopedia of Polymer Science and Technology, vol. 13, 1970, p. 392, and references cited therein.

The polystyrene resin and the interpolymer can be combined with the polyphenylene ether as separate components in known ways, e.g., by mechanical blending, co-extrusion and the like.

With respect to the interpolymer, the desired particle size distribution, i.e., numbers of particles concentrated predominantly on the smaller end of the range, can be provided by emulsion grafting the vinyl aromatic compound or a mixture of the vinyl aromatic compound with up to 33% of alkyl acrylate onto a latex rubber in which the latex particles are in the pre-selected particle size distribution. Grafting seems to add a vary small, almost negligible, increase of about 5% to the mean particle diameter. The interpolymer is then combined with the polyphenylene ether and the styrene resin and the size of the particles will remain generally the same in the final composition. Care should be taken however to make sure that not so much rubber is used that the particles agglomerate into large masses. The advantages outlined above will not be secured with agglomerated compositions. For this reason, the upper limit on the rubber content in the interpolymer component (c) appears to be about 70% by weight. At 80% and particularly at 90% by weight of diene rubber in the interpolymer, agglomeration during mixing with the polyphenylene ether and the styrene resin components appears to be difficult to avoid.

The polyphenylene ethers with which this invention is concerned are fully described in the above-mentioned Hay and Stamatoff patents. The polyphenylene ethers are self-condensation products of monohydric, monocyclic phenols which can be produced, for example, by reacting the phenols with oxygen in the presence of complex copper catalysts. In general, molecular weight will be controlled by reaction time, longer times providing a higher average number of repeating units.

A preferred family of polyphenylene ethers will have repeating structural units of the formula:

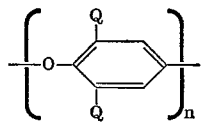

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atoms, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Illustrative members are:

poly(2,6-dilauryl-1,4-phenylene)ether;
poly(2,6-diphenyl-1,4-phenylene)ether;
poly(2,6-dimethoxy-1,4-phenylene)ether;
poly(2,6-diethoxy-1,4-phenylene)ether;
poly(2-methoxy-6-ethoxy-1,4-phenylene)ether;
poly(2-ethyl-6-stearyloxy-1,4-phenylene)ether;
poly(2,6-dichloro-1,4-phenylene)ether;
poly(2-methyl-6-phenyl-1,4-phenylene)ether;
poly(2,6-dibenzyl-1,4-phenylene)ether;
poly(2-ethoxy-1,4-phenylene)ether;
poly(2-chloro-1,4-phenylene)ether;
poly(2,6-dibromo-1,4-phenylene)ether;

and the like.

For purposes of the present invention an especially preferred family of polyphenylene ethers include those having alkyl substitution in the two positions ortho to the oxygen ether atom, i.e., those of the above formula wherein each Q is alkyl, most preferably having from 1 to 4 carbon atoms. Illustrative members of this class are:

poly(2,6-dimethyl-1,4-phenylene)ether;
poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether;
poly(2-ethyl-6-propyl-1,4-phenylene)ether;

and the like.

The most preferred polyphenylene ether resin for purposes of the present invention is poly(2,6-dimethyl-1,4-phenylene)ether. This resin readily forms a compatible and single phase composition with polystyrene resins over the entire range of combining ratios.

In the present compositions, the polyphenylene ether is combined with the polystyrene or a rubber-modified polystyrene and the interpolymer. The term "polystyrene" is used herein in the same manner as defined in Cizek, U.S. 3,383,435. Such styrene resins will be combinable with the polyphenylene ether and, in general, will be selected from those having at least 25% by weight of the polymer units derived from a vinyl aromatic monomer, e.g., one having the formula

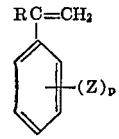

wherein R is hydrogen, (lower)alkyl, e.g., of from 1 to 4 carbon atoms or halogen; Z is hydrogen, vinyl, halogen or (lower)alkyl; and p is 0 or a whole number of from 1 to 5. Illustrative polystyrene resins include homopolymers of polystyrene; polychlorostyrene; poly-α-methylstyrene; and the like; styrene-containing copolymers, such as styrene-acrylonitrile copolymers; copolymers of ethylvinylbenzene and divinylbenzene; styrene-acrylonitrile-α-methylstyrene terpolymers; and the like. Preferred polystyrene resins of this class are homopolystyrene; poly-α-methylstyrene; styrene-acrylonitrile copolymers; styrene-α-methylstyrene copolymer; styrene-methyl methacrylate copolymer; and poly-α-chlorostyrene.

The term "rubber" as used herein to define a family of rubber modified high impact polystyrenes including polymeric materials natural and synthetic, which are elastomers at room temperatures, e.g., 20 to 25° C. The term "rubber" includes, therefore, natural or synthetic rubbers of the type generally used in preparing impat polymers. Illustrative rubbers, including diene rubbers, for use in both the interpolymers and the high impact rubber modified polystyrenes are natural rubber and polymerized diene rubbers, e.g., polybutadiene, polyisoprene, and the like, and copolymers of such dienes with vinyl monomers, e.g., vinyl aromatic monomers, such as styrene. Examples of suitable rubbers or rubbery copolymers are natural crepe rubber, synthetic SBR type rubber containing from 40 to 98% by weight of butadiene and from 60 to 2 percent by weight of styrene prepared by either hot or cold emulsion polymerization, synthetic GR-N type rubber containing from 65 to 82 percent by weight of butadiene and from 35 to 18 percent by weight of acrylonitrile, and synthetic rubbers prepared from, for example, butadiene, butadiene-styrene or isoprene by methods, e.g., those employing heterogeneous catalyst systems, such as a trialkyl-aluminum and a titanium halide. Among the synthetic rubbers, including non-diene rubbers, which may be used in preparing the present compositions are elastomeric modified diene homopolymers e.g., hydroxy- and carboxy-terminated polybutadienes; polychlorobutadienes, e.g., neoprenes; polyisobutylene, and copolymers of isobutylene with butadiene or isoprene; polyisoprene; copolymers of ethylene and propylene and interpolymers thereof with butadiene; thiokol rubbers; polysulfide rubbers; acrylic rubbers; polyurethane rubbers; copolymers of dienes, e.g., butadiene and isoprene, with various comonomers, such as alkyl unsaturated esters, e.g., methyl methacrylate; unsaturated ketones, e.g., methylisopropenyl ketone, vinyl heterocyclics, e.g., vinyl pyridine; polyether rubbers; epichlorohydrin rubbers and the like. The preferred rubbers comprise polybutadiene and rubbery copolymers of butadiene with styrene.

The term "interpolymer" of rubber with a vinyl aromatic compound or a mixture of a vinyl aromatic compound with an alkyl acrylic ester defines a class of compounds comprising a two-phase system in which the rubber is dispersed in a polyvinyl aromatic (or mixture thereof with polyacrylate) resin matrix in the form of discrete particles. Commercially, such interpolymers are usually made by grafting of rubber in the presence of polymerizing vinyl aromatic compound, e.g., styrene, or a mixture thereof with an alkyl acrylate or methacrylate, e.g., methyl methacrylate. Such systems consist of a continuous phase of the polymerized vinyl aromatic monomer in which the rubber or elastomer is dispersed in a discontinuous elastomeric gel phase, with or without grafted chains of polymerized styrene monomer. The particles may contain occluded, polymerized vinyl aromatic monomer, too.

Methods for preparing such interpolymers of rubber with vinyl aromatic compounds in which the elastomer graft is of controlled particle size are known.

With respect to particle sizes in the range 0.05 to 1.0 micron, and larger, these are provided in a number of ways, including mechanical blending of rubber with polystyrene under intensive conditions, co-precipitation of finely divided rubber latices and polystyrene latices, emulsion grafting and the like. For example, a diene rubber latex can be provided in which the majority of the particles in the latex are less than about 0.5 micron and preferably less than about 0.25 micron with the predominant fraction in the 0.2 micron range. Then a styrene monomer (or a mixture thereof with an alkyl acrylate) can be emulsified into the latex and emulsion grafted in known ways. Coagulation of the polymerization product then provides an emulsion polymerization product of a styrene monomer (or mixed styrene and acrylate) and a rubber, the product having nearly the same particle sizes or only up to about 5% greater. Suitable procedures for preparing such products will be exemplified hereinafter.

The interpolymer used to modify the polyphenylene ether combination with polystyrene resin matrix preferably comprises one in which the elastomeric phase comprises particles of polystyrene grafted diene elastomer gel. Especially preferably, in such interpolymers, the elastomer will be derived from butadiene, from a butadiene styrene copolymer or from a mixture thereof. Such materials can be made by well known methods, e.g., those cited above.

With respect to the ratios between components, in the preferred embodiments of the invention, the interpolymer of rubber with vinyl aromatic compound will comprise an emulsion polymerization product of about 70 to 30 parts by weight of styrene monomer with about 30 to 70 parts by weight of a diene rubber, such product providing a dispersed elastomeric phase with particle size of at least about 0.05 micron, from about 85 to 100% of the particles being about 0.5 micron or less in size and from 0 to about 15% of the particles being greater than about 0.5 micron in size. The rubber modified high impact polystyrene resin component—if present—will comprise a bulk or suspension polymerization product of about 88 to 96 parts by weight of styrene monomer with about 12 to 4 parts by weight of a diene rubber, said bulk or suspension polymerization product providing a dispersed elastomeric phase with particle size of at least about 0.05 micron, from 0 to about 75% of the number of particles being about 0.5 micron or less in size and from about 25 to 100% of the number of particles being greater than about 0.5 micron in size. A suitable interpolymerization product can be made by grafting styrene onto a rubber latex, as described hereinafter. A suitable rubber modified polystyrene of the second type can be made by those skilled in the art in known ways and as described hereinafter. Rubber modified polystyrene resins are commercially available.

As is described in Cizek, U.S. Pat. 3,383,435, polyphenylene ethers and polystyrene resins are combinable with each other in all proportions and they exhibit a single set of thermodynamic properties. The present compositions therefore can comprise from 1 to 99% by weight polyphenylene ether resin and from 99 to 1% polystyrene resin, on a rubber-free basis, and these are included within the scope of the invention. In general, compositions in which the polystyrene resin, on a rubber-free basis, comprises from 20 to 80% by weight of the polystyrene and the polyphenylene ether, are preferred because after molding they have the best combination of impact strength, surface appearance and resistance to solvents. Particularly useful and preferred are compositions in which the polystyrene resin, on a rubber-free basis, comprises from 40 to 60% by weight of the combined weight of the polystyrene and the polyphenylene ethers. Properties, such as flexural strength, tensile strength, hardness and especially impact strength appear to be at a maximum in such preferred compositions.

The rubber content in the instant compositions can vary, although no advantage is secured in exceeding a maximum of about 30% by weight of the total weight of the composition. If the elastomeric phase content falls below about 1% by weight, impact properties decline. The preferred range of elastomeric phase content is from about 5 to about 25% by weight. At the higher rubber levels, as has been mentioned, there is some tendency for the rubber to agglomerate, with loss of impact strength. If the rubber is well dispersed—and there are no agglomerated masses present—7 to 10% of rubber in the final compositions will readily give Izod impact strengths of 4 to 5 ft. lb./in. notch. Even a small amount of agglomeration, at comparable rubber levels, has a marked adverse effect on impact strength, however. At low rubber levels, within the range stated above, agglomeration and consequent loss of impact strength is almost never a cause of difficulty.

The method used to form the polyphenylene ether-interpolymer of rubber and vinyl aromatic compositions of the invention is not critical provided that it permits the above-recited distribution of the elastomer particles to be maintained in the specified size range. The preferred method is one in which the polyphenylene ether is mixed with the rubber-vinyl aromatic interpolymer and the polystyrene or rubber modified polystyrene resins using any conventional mixing methods and the composition so formed is molded to any desired shape such as by extrusion, hot molding or the like.

It should, of course, be obvious to those skilled in the art that other additives may be included in the present compositions such as plasticizers, pigments, flame retardant additives, reinforcing agents, stabilizers, and the like. In such cases, all concentrations and ratios of the resinous ingredients disclosed herein, and the like, will be adjusted to reflect the presence of such additives.

The following procedures illustrate the preparation of an interpolymer of diene rubber and vinyl aromatic compound with a particle size distribution useful to prepare the compositions of this invention.

Procedure A

A polymerized diene rubber (rubbery copolymer of butadiene and styrene) latex is prepared using the following recipe:

| Ingredients: | Parts by weight |
| --- | --- |
| Butadiene | 70 |
| Styrene | 30 |
| Water (demineralized) | 330 |
| Soap flakes (sodium oleate and stearate) | 7.5 |
| Potassium persulfate | 0.7 |
| Dodecyl mercaptan | 0.05 |

The polymerization is carried out in a closable reactor provided with a heating and cooling jacket and an anchor stirrer. The water, soap, potassium persulfate and dodecyl mercaptan are charged in that order, stirring to dissolve. The styrene monomer is added. The reactor is then closed, the reactor space above the liquid purged with butadiene vapor, and the formula amount of butadiene charged. The temperature is then raised to 140° F., and stirring is continued for 24 hours. The butadiene is vented and the vessel cooled to provide a diene rubber latex with about 30% solids content.

The latex is graft copolymerized with styrene monomer in the following recipe:

| Ingredients: | Parts by weight |
| --- | --- |
| 70/30 butadiene-styrene latex (30% solids) | 200 |
| Styrene | 40 |
| Potassium persulfate | 2 |
| Water (distilled) | 80 |

The latex, water, styrene and potassium persulfate are charged into a closable vessel and purged with nitrogen. The mixture is heated to 45° C. and agitated for 18 hours. The latex is filtered.

The product, which is a 60/40 interpolymer of diene rubber-styrene, is recovered by congulating the latter with 1% calcium chloride solution, dewatering the coagulum on a filter, washing, with water, milling at 310–320° F. for 20 minutes, cooling and comminuting into granules.

The most preferred interpolymer compositions prepared by the above procedure will have at least 85% and preferably 100% of the rubber in the form of elastomeric particles of about 0.5 micron or less, when dispersed in a polymer matrix, e.g., of polyphenylene ether resin or polystyrene resin. In a typical case, about 30% of the number of particles will be in the 0.05–0.15 micron range; about 56% will be in the 0.2 micron range and the balance will be in the 0.5 micron range—with only up to about 2% of the number of particles being greater than 0.5 micron in size, e.g., 1.0 micron, or so.

Instead of styrene monomer, mixtures of styrene monomer with up to 33⅓% by weight of methyl methacrylate can be used to obtain the corresponding interpolymers. Obvious adjustments in reaction conditions can be made to provide any desired percentage or rubber content, etc.

Procedure B

An emulsion grafted interpolymer of polybutadiene rubber and styrene monomer with the majority of the rubber particles in the 0.5 micron and below range is prepared as follows:

The polymerized butadiene rubber substrate latex is prepared using the following recipe:

| Ingredients: | Parts by weight |
| --- | --- |
| Butadiene | 100.0 |
| Demineralized water | 125.0 |
| Potassium oleate | 2.00 |
| $K_2S_2O_8$ | 0.30 |
| Mixed tert. mercaptan (60:20:20 of $C_{12}:C_{14}:C_{16}$) | 0.10 |
| KOH | 0.10 |

The mixture is injected into a reactor and polymerized under autogenous pressure at 65° C. The latex particles range in size from 0.01 micron to 0.25 micron with the majority of the particles having a size of about 0.05 micron.

The latex is graft copolymerized with styrene monomer in the following recipe:

| Ingredients: | Parts by weight |
| --- | --- |
| Polymerized diene rubber (above) | 50 |
| Styrene monomer | 50 |
| $Na_4P_2O_7$ (anhydrous) | 0.5 |
| Dextrose | 1.0 |
| Water (including that present in latex) | 182 |
| Sodium salt of hydrogenated disproportionated rosin | 2.0 |
| NaOH | 0.105 |
| $FeSO_4 \cdot 7H_2O$ | 0.011 |
| Mixed tertiary mercaptan (60:20:20 of $C_{12}:C_{14}:C_{16}$) | 0.5 |
| Cumene hydroperoxide | 1.0 |

The recipe is charged into a pressure tight reactor and heated at 60° C. for about 85 minutes; during which conversion to the emulsion graft copolymer is substantially complete.

The product is recovered by coagulating the final latex with dilute brine and sulfuric acid, heating to 95° C. to produce partial granulation of the coagulated product, filtering, washing and, finally, drying to constant weight at 110° C.

Ways to prepare the rubber modified polystyrene resin (as contrasted with the interpolymer component) are well known. If for example, polymerization of a solution of rubber in styrene monomer is carried out in bulk and the mixture is agitated during the beginning stages to form the desired particle size and then stirring is reduced and polymerization is completed a suitable rubber modified polystyrene will be produced. On the other hand, for example, in the method of Bender, J. Appl. Polymer Science, 9, 2887 (1965), a bulk pre-polymerization of rubber in styrene monomer is carried out with agitation until the desired dispersion of elastomer particles is obtained then water and surfactants are added and polymerization is completed in suspension. In addition, as has been mentioned above, rubber and the polystyrene resin can be mechanically mixed under relatively severe shearing forces in, for example, an intensive mixer of the Banbury-type, until a rubber modified polystyrene with elastomer particles of the desired size are obtained. Such rubber modified polystyrene resins are available from a number of sources. In addition, suitable procedures for preparing rubber particles in the 0.5 to 20 micron range will be exemplified hereinafter.

Procedure C

A bulk grafted rubber modified polystyrene resin suitable for use in certain embodiments of this invention is prepared as follows:

Eight parts of a rubbery styrene-butadiene copolymer (28% S—72% BD) is dissolved in 92 parts of styrene monomer and the polymerization is carried out at 117° C. for 5 hours with stirring (degree of polymerization 20–40%), followed by heating at 155 to 175° C. for 12 hours without stirring. The product is cooled and broken up into granules.

A suspension grafted rubber modified polystyrene suitable for use in this invention can be prepared as follows: styrene, 920 g.; a rubbery butadiene styrene copolymer, 80 g.; tert-dodecyl mercaptan, 2.0 g.; Ionol CP, 2.0 g.; benzoyl peroxide, 0.5 g.; and dicumyl peroxide, 0.5 g., are partially polymerized under nitrogen in a slowly stirred 1-gallon reactor at 85–95° C. until polymerization is about 30% complete. Then an aqueous suspension of the prepolymer is formed by adding to the reactor 2000 g. of water containing 0.07% of poly(vinyl alcohol), 0.02% alkyl aryl sulfonate and 0.08% sodium chloride. Polymerization is completed in 16–20 hours at 130–140° C. with sufficient agitation to keep the particles suspended. The product is recovered in the form of beads, which are washed and dried. Finally, the beads are passed through an extruder at 350° F., followed by granulation.

After dispersion in a matrix of polyphenylene ether and measurement, such products typically have elastomer dispersions comprising greater than 15% of the number of particles above 0.5 micron in size, e.g., 35%. Less than 85% of the number of particles, e.g., 68% will be 0.5 micron or less in size.

DESCRIPTION OF THE PREFERRED EMBODIMENTS

The invention will be further illustrated by the following examples wherein, unless otherwise indicated, all compositions are prepared by blending, then passing mixtures of the polyphenylene ether, the interpolymer and the polystyrene or the high-impact polystyrene and other ingredients, if present, through a variable pitch, single screw one-inch extruder with extrusion temperature maintained between about 550° and 580° F. All parts are by weight. The strands emerging from the extruder are cooled, chopped into pellets and molded into test bars using a 3 oz. Newbury injection molding machine with 550° F. cylinder temperature, 180° F. mold temperature and 500 p.s.i. injection pressure. Izod impact strength is determined by ASTM D–256 on 0.125 x 0.5 x 2.5 inch specimens; tensile and flexural strengths are determined by ASTM D–638 and D–790. Heat distortion temperatures by ASTM D–648. The Gardner impact strength is measured with 2, 6 and 10 lbs. hammers on 2.5 x 2.5 x 0.125 in. specimens.

EXAMPLE 1

The following formulation is blended and molded:

Material: Parts by weight
Poly(2,6-dimethyl-1,4-phenylene)ether [1] _____ 45
Crystal polystyrene [2] _____ 40
60/40 interpolymer of diene rubber and styrene [3] _____ 15

[1] In pellet form, intrinsic viscosity 0.45–0.65 dl./g.
[2] Crystal homopolystyrene—High heat resistant, general purpose molding grade, Monsanto Company HH–101.
[3] Interpolymer of rubbery butadiene-styrene copolymer, 60% by weight, with 40% styrene monomer; with about 29.8% of the number of particles in the 0.05–0.15 micron range; about 56.5% of the number of particles in the 0.2 micron range; about 13.9% of the particles in the 0.25 micron range, and no particles above 0.5 micron in size.

The composition is molded into test specimens and the following impact properties are obtained:

Izod impact (ft. lbs./in. notch) _____ 4.1
Gardner impact (in. lbs.) _____ 183

For comparison purposes, a formulation is made, containing no interpolymer and 45 parts of poly(2,6-dimethyl-1,4-phenylene)ether and 55 parts of crystal homopolystyrene. The Izod impact strength is only 0.7 ft. lbs./in. notch. It is thus seen that the interpolymer is useful to reinforce otherwise rubber-free compisitions of polyphenylene ethers and styrene resins.

The following formulations are blended and molded to demonstrate the effect of increasing the 60/40 interpolymer in the present compositions:

| Material | Parts by weight of— | | | | | |
|---|---|---|---|---|---|---|
| | A | B | C | D | E | Control |
| Poly(2,6-dimethyl-1,4-phenylene)-ether (as above) | 45 | 45 | 45 | 45 | 45 | 45 |
| High impact rubber modified polystyrene [1] | 47.5 | 40 | 30 | 10 | 0 | 55 |
| 60/40 interpolymer of diene rubber and styrene (as above) | 7.5 | 15 | 25 | 45 | 55 | 0 |

[1] High impact rubber modified polystyrene, in pellet form, containing about 8% by weight of polybutadiene in the form of a polystyrene grafted elastomeric phase dispersed in a matrix of polystyrene, about 68.5% of the number of particles being below 0.5 micron in size and about 34.8% of the particles being above 0.5 micron in size. This distribution carries over into the control sample.

In the blended compositions, A–E, there is at least 85% of the number of particles below 0.5 micron and less than 15% of the particles above 0.5 micron in size.

The compositions are molded into test specimens and the following impact strengths are obtained:

| | A | B | C | D | E | Control |
|---|---|---|---|---|---|---|
| Izod impact (ft. lbs./in. notch) | 6.2 | 6.8 | 7.5 | 9.2 | 9.3 | 4.2 |
| Gardner impact (in.lbs.) | 222 | 230 | 242 | 254 | 220 | 150 |

In composition B, about 95% of the number of elastomer particles are below 0.5 micron (24%, 0.05–0.15; 51%, 0.2; 15%, 0.25; 5%, 0.5) and about 5% are greater than 0.5 micron (2%, 0.8; 2%, 1.5; 1%, 2.0).

A substantial increase in the impact strengths in comparison to the rubber-containing control is seen at levels between 7–5 and 55 parts of interpolymer in the composition. The surface appearance of the molded articles is excellent.

To demonstrate and compare the retention of impact strengths at low temperatures, the following formulations are blended and molded:

| Material | Parts by weight of— | |
|---|---|---|
| | F | Control |
| Poly(2,6-dimethyl-1,4-phenylene)ether (as above) | 45 | 45 |
| High impact rubber modified polystyrene (as above) | 40 | 55 |
| 60/40 interpolymer of diene rubber and styrene (as above) | 15 | 0 |

Both formulations contain the same, minor quantities of processing aids and stabilizers. The impact strengths are measured by standard procedures, but in a cold environment at —40° F. on cold specimens. The following results are obtained.

| | F | Control |
|---|---|---|
| Izod impact (ft.lbs./in. notch) | 3.92 | 1.4 |
| Gardner impact (in.lbs.) | 254 | 50 |

A substantial retention in this property is obtained at low temperature with the present composition, while the control loses its impact strength. In addition, the control breaks into brittle pieces at low temperature while the present compositions have ductile or shear type breaks, indicating improved low temperature toughness capability.

The following additional, commercially important properties are measured for Composition F and the Control:

| Material | F | Control |
|---|---|---|
| Tensile yield strength (p.s.i.) | 7,860 | 8,300 |
| Tensile ultimate strength (p.s.i.) | 7,640 | 8,920 |
| Elongation, percent | 77 | 83 |
| Flexural modulus (p.s.i.) | 290,000 | 365,000 |

While decreases in tensile-elongations and flexural strengths are seen, they are still excellent and not product limiting. The gloss of the molded articles is high despite the increased rubber content in Composition F.

EXAMPLE 2

The following formulation is blended and molded:

Material: Parts by weight
Poly(2,6-dimethyl-1,4-phenylene) ether (as in Example 1) _____ 45
Crystal polystyrene (as in Example 1) _____ 40
30/70 interpolymer of diene rubber and styrene [1] _____ 15

[1] Interpolymer of rubbery butadiene-styrene copolymer, 30% by weight, with 70% styrene monomer, about 98% of the number of elastomer particles bing below about 0.5 micron in size and 2%, maximum, of the number of particles being greater than 0.5 micron in size.

The composition is molded into test specimens and the following impact properties are obtained:

Izod impact (ft. lbs./in. notch) _____ 1.65
Gardner impact (in. lbs.) _____ 130

In comparison, a control—without interpolymer—has an Izod impact of only 0.7 ft. lb./in. notch and a Gardner impact of only 4 in. lbs.

The following formulations are blended and molded to demonstrate the effect of increasing the 30/70 interpolymer in the present compositions:

| Material | Parts by weight of— | | | | |
|---|---|---|---|---|---|
| | G | H | I | J | Control |
| Poly(2,6-dimethyl-1,4-phenylene)ether (as above) | 45 | 45 | 45 | 45 | 45 |
| High impact rubber modified polystyrene (as in Example 1) | 47.5 | 40 | 30 | 0 | 55 |
| 30/70 interpolymer of diene rubber and styrene (as above) | 7.5 | 15 | 25 | 55 | 0 |

In the final compositions at least 85% of the number of particles are 0.5 micron or below in size and no more than 15% of the number of particles are above 0.5 micron in size.

The compositions are molded into test specimens and the following impact properties are obtained:

|  | G | H | I | J | Control |
|---|---|---|---|---|---|
| Izod impact (ft. lbs./in. notch) | 4.9 | 5.3 | 5.9 | 5.7 | 4.2 |
| Gardner impact (in. lbs.) | 256 | 260 | 276 | 284 | 150 |

A marked increase in the impact strength is seen in comparison to the rubber-containing controls. In the control, about 35% of the number of particles are greater than 0.5 micron in size. The surface appearance of the molded articles according to this invention is outstanding.

To demonstrate and compare the retention of impact strengths at low temperatures, the following formulations are molded and tested:

| Materials | Parts by weight of— | |
|---|---|---|
|  | K | Control |
| Poly(2,6-dimethyl-1,4-phenylene)ether (as above) | 45 | 45 |
| High impact rubber modified polystyrene (as above) | 40 | 55 |
| 30/70 interpolymer of diene rubber and styrene (as above) | 15 | 0 |

Both formulations contain the same, minor quantities of processing aids and stabilizers. The impact strengths are measured by standard procedures, but in a cold environment at —40° F. on cold specimens.

The following results are obtained:

|  | K | Control |
|---|---|---|
| Izod impact (ft. lbs./in. notch) | 2.3 | 1.4 |
| Gardner impact (in. lbs.) | 218 | 50 |

A substantial retention in impact strength is obtained at low temperature with the composition according to this invention.

The following additional properties are measured for composition K and the control:

| Property | K | Control |
|---|---|---|
| Tensile yield strenfth (p.s.i.) | 8,860 | 8,300 |
| Tensile ultimate strength (p.s.i.) | 9,260 | 8,920 |
| Elongation, percent | 82 | 83 |
| Flexural modulus (p.s.i.) | 301,000 | 325,000 |

The improved impact properties are obtained without detrimentally affecting other commercially important properties. The gloss is outstanding.

EXAMPLE 3

The following formulation is blended and molded:

Material: Parts by weight
Poly(2,6-dimethyl-1,4-phenylene) ether (as in Example 1) _____ 45
Crystal polystyrene (as in Example 1) _____ 40
70/30 interpolymer of diene rubber and styrene [1] _____ 15

[1] Interpolymer of rubbery butadiene-styrene copolymer, 70% by weight, with 30% styrene monomer, about 95% of the number of particles being below about 0.5 micron in size and 5%, maximum, of the number of particles being greater than 0.5 micron in size.

The composition is molded into test specimens and the following impact properties are obtained:

Izod impact (ft. lbs./in. notch) _____ 1.92
Gardner impact (in. lbs.) _____ 20

In comparison, a control—without interpolymer—has an impact of only 0.7 ft. lb./in. notch and a Gardner impact of only 4 in. lbs.

The following formulations are blended and molded to demonstrate the effect of increasing the 70/30 interpolymer in the present compositions:

| Material | Parts by weight of— | | | |
|---|---|---|---|---|
|  | L | M | N | Control |
| Poly(2,6-dimethyl-1,4-phenylene)ether (as above) | 45 | 45 | 45 | 45 |
| High impact rubber modified polystyrene (as in Example 1) | 47.5 | 40 | 30 | 55 |
| 70/30 interpolymer of diene rubber and styrene (as above) | 7.5 | 15 | 25 | 0 |

In all the compositions (except the control), at least 85% of the number of elastomeric particles are 0.5 micron or below in size.

The compositions are molded into test specimens and the following impact properties are obtained:

|  | L | M | N | Control |
|---|---|---|---|---|
| Izod impact (ft. lbs./in. notch) | 5.0 | 6.5 | 7.3 | 4.2 |
| Gardner impact (in. lbs.) | 175 | 260 | 250 | 150 |

A marked increase in impact strength is seen in comparison to the rubber-containing controls. The surface appearance of the molded articles is outstanding.

To demonstrate and compare the retention of impact strengths at low temperatures, the following formulations are molded and tested.

| Material | Parts by weight of— | |
|---|---|---|
|  | 0 | Control |
| Poly(2,6-dimethyl-1,4-phenylene)ether (as above) | 45 | 45 |
| High impact rubber modified polystyrene (as above) | 40 | 55 |
| 70/30 interpolymer of diene rubber and styrene (as above) | 15 | 0 |

Both formulations contain the same, minor quantities of processing aids and stabilizers. The impact strengths are measured by standard procedures, but in a cold environment at —40° F. on cold specimens.

The following results are obtained:

|  | 0 | Control |
|---|---|---|
| Izod impact (ft. lbs./in. notch) | 4.08 | 1.4 |
| Gardner impact (in. lbs.) | 246 | 50 |

A substantial retention in impact strength is obtained at low temperature with the composition of this invention.

The following additional properties are measured for composition 0 and the control:

| Property | 0 | Control |
|---|---|---|
| Tensile yield strength (p.s.i.) | 7,480 | 8,300 |
| Tensile ultimate strength (p.s.i.) | 7,620 | 8,920 |
| Elongation, percent | 5 | 83 |
| Flexural modulus (p.s.i.) | 286,000 | 325,000 |

The decreases in tensile/elongation and flexural strength are not product limiting and are more than compensated by the increase in impact strength. The gloss of the present composition is outstanding, even though the total rubber content is almost 3-fold that of the control.

EXAMPLE 4

The following formulation is blended and molded:

Material: Parts by weight
Poly(2,6-dimethyl-1,4-phenylene)ether (as in Example 1) _____ 45
Crystal polystyrene (as in Example 1) _____ 40
60/40 interpolymer of diene rubber and styrene/ MMA-85/15 [1] _____ 15

[1] Interpolymer of rubbery butadiene-styrene copolymer, 60% by weight, with 40% of a mixture of styrene and methyl methacrylate monomers (85 Sty-15 MMA), at least about 95% of the number of particles being below 0.5 micron in size and up to about 5% of the number of particles being above 0.5 micron in size.

The composition is molded into test specimens and the following impact properties are obtained:

Izod impact (ft. lbs./in. notch) _____ 4.2
Gardner impact (in. lbs.) _____ 220

In comparison, a control—without interpolymer—has an Izod impact of only 0.7 ft. lb./in. notch and a Gardner impact of only 4–7 in. lbs.

The following formulations are blended and molded to demonstrate the effect of increasing the 60/40 interpolymer of diene rubber and Sty-MMA (85–15) in the present compositions:

| Material | P | Q | R | S | Control |
|---|---|---|---|---|---|
| Poly(2,6-dimethyl-1,4-phenylene)ether (as above) | 45 | 45 | 45 | 45 | 45 |
| High impact rubber modified polystyrene (as in Example 1) | 47.5 | 40 | 30 | 0 | 55 |
| 60/40 interpolymer of diene rubber and styrene-MMA (as above) | 7.5 | 15 | 25 | 55 | 0 |

The compositions are molded into test specimens and the following impact properties are obtained:

| | P | Q | R | S | Control |
|---|---|---|---|---|---|
| Izod impact (ft.lbs./in. notch) | 5.4 | 6.4 | 8.1 | 9.5 | 4.2 |
| Gardner impact (in.lbs.) | 253 | 269 | 237 | 210 | 130 |

A marked increase in impact strength is seen in comparison to the rubber-containing controls. The surface appearance of the molded articles is outstanding.

To demonstrate and compare the retention of impact strengths at low temperatures, the following formulations are molded and tested.

| Materials | Parts by weight of— | |
|---|---|---|
| | T | Control |
| Poly(2,6-dimethyl-1,4-phenylene)ether (as above) | 45 | 45 |
| High impact rubber modified polystyrene (as above) | 40 | 55 |
| 60/40 interpolymer of diene rubber and styrene-MMA (as above) | 15 | 0 |

Both formulations contain the same, minor quantities of processing aids and stabilizers. The impact strengths are measured by standard procedures, but in a cold environment at −40° F. on cold specimens.

The following results are obtained:

| | T | Control |
|---|---|---|
| Izod impact (ft.lbs./in. notch) | 3.1 | 1.4 |
| Gardner impact (in.lbs.) | 232 | 50 |

A substantial retention in impact strength is obtained at low temperature with the composition of this invention.

The following additional properties are measured for composition T and the control:

| Property | T | Control |
|---|---|---|
| Tensile yield strength (p.s.i.) | 7,840 | 8,300 |
| Tensile ultimate strength (p.s.i.) | 7,980 | 8,920 |
| Elongation, percent | 79 | 83 |
| Flexural modulus (p.s.i.) | 301,000 | 311,000 |
| Heat distortion temp., ° F. at 264 p.s.i. | 251 | 248 |

The decreases in tensile/elongation and flexural strength are not product limiting and are more than compensated by the increase in impact strength. The gloss of the present compositions is outstanding, even though the total rubber content is almost 3-fold that of the control.

EXAMPLE 5

The following formulation is blended and molded:

Material: Parts by weight
  Poly(2,6 - dimethyl - 1,4-phenylene)ether (as in Example 1) _____ 45
  Crystal polystyrene (as in Example 1) _____ 40
  60/40 interpolymer of diene rubber and styrene-MMA-70/30 [1] _____ 15

[1] Interpolymer of rubbery butadiene-styrene copolymer, 60% by weight, with 40% of a mixture of styrene and methyl methacrylate monomers (70 Sty–30 MMA), at least 95% of the number of particles being 0.5 micron or below in size and up to 5% maximum of the particles being above 0.5 micron in size.

The composition is molded into test specimens and the following impact properties are obtained:

Izod impact (ft. lbs./in. notch) _____ 2.1
Gardner impact (in. lbs.) _____ 190

The particle size distribution remains the same after blending and molding.

In comparison, a control—without interpolymer—has an Izod impact of only 0.7 ft. lbs./in. notch and a Gardner impact of only 4–7 in. lbs.

The following formulations are blended and molded to demonstrate the effect of increasing the 60/40 interpolymer of diene rubber and Sty-MMA (70–30) in the present compositions:

| Material | U | V | W | X | Control |
|---|---|---|---|---|---|
| Poly(2,6-dimethyl-1,4-phenylene) ether (as above) | 45 | 45 | 45 | 45 | 45 |
| High impact rubber modified polystyrene (as in Example 1) | 47.5 | 40 | 30 | 0 | 55 |
| 60/40 interpolymer of diene rubber and styrene-MMA (as above) | 7.5 | 15 | 25 | 55 | 0 |

The compositions are molded into test specimens and the following impact properties are obtained:

| | U | V | W | X | Control |
|---|---|---|---|---|---|
| Izod impact (ft. lbs./in. notch) | 5.4 | 6.3 | 8.6 | 5.6 | 4.2 |
| Gardner impact (in. lbs.) | 267 | 282 | 250 | 150 | 130 |

A marked increase in impact strength is seen in comparison to the rubber-containing controls. The higher amount of cografted MMA, by comparison with the compositions of Example 4, leads to somewhat lower impact resistance. The surface appearance of the molded articles is outstanding.

The following additional properties are measured for composition Y (polyphenylene ether—rubber modified polystyrene—60/40 interpolymer (as above) 45:40:15) and the control:

| Property | Y | Control |
|---|---|---|
| Tensile yield strength (p.s.i.) | 7,920 | 8,300 |
| Tensile ultimate strength (p.s.i.) | 8,000 | 8,920 |
| Elongation, percent | 81 | 82 |
| Flexural modulus (p.s.i.) | 286,000 | 311,000 |
| Heat distortion temp., ° F., at 264 p.s.i. | 251 | 248 |

The decrease in tensile/elongation and flexural strength is not product limiting and is more than compensated by the increase in impact strength. The gloss of the present compositions is outstanding, even though the total rubber content is almost 3-fold that of the control.

EXAMPLE 6

The following formulation is blended and molded:

| Material: | Parts by weight |
|---|---|
| Poly(2,6 - dimethyl - 1,4-phenylene)ether (as in Example 1) | 40 |
| High impact polystyrene [1] | 50 |
| 50/50 interpolymer of diene rubber and styrene [2] | 10 |

[1] High impact rubber modified polystyrene, in pellet form, containing about 8% by weight of polybutadiene, Monsanto Company HT-91, about 95% of the number of particles being greater than about 0.5 micron in size.

[2] Interpolymer containing about 50% by weight of polybutadiene in the form of a polystyrene grafted elastomeric phase, about 95% of the number of particles being 0.5 micron or less in size and less than about 5% of the particles being greater than about 0.5 micron in size.

The composition is molded into test specimens and the following physical properties are obtained:

| | |
|---|---|
| Izod impact (ft. lbs./in. notch) | 2.5 |
| Elongation to failure (percent) | 35.5 |
| Tensile yield strength (p.s.i.) | 9000 |
| Tensile ultimate strength (p.s.i.) | 7600 |

EXAMPLE 7

The following formulation is blended and molded:

| Material: | Parts by weight |
|---|---|
| Poly(2,6 - dimethyl-1,4-phenylene) ether (as in Example 1) | 40 |
| High impact rubber modified polystyrene (as in Example 6) | 40 |
| 50/50 interpolymer of butadiene and styrene (as in Example 6) | 20 |

The composition is molded into test specimens and the following physical properties are obtained:

| | |
|---|---|
| Izod impact (ft. lbs./in. notch) | 5.0 |
| Elongation to failure (percent) | 47 |
| Tensile yield strength (p.s.i.) | 8500 |
| Tensile ultimate strength (p.s.i.) | 7700 |

EXAMPLE 8

The following formulation is blended and molded:

| Material: | Parts by weight |
|---|---|
| Poly(2,6 - dimethyl-1,4-phenylene)ether (as in Example 1) | 40 |
| High impact rubber modified polystyrene (as in Example 6) | 30 |
| 50/50 interpolymer of butadiene and styrene (as in Example 6) | 30 |

The composition is molded into test specimens and the following physical properties are obtained:

| | |
|---|---|
| Izod Impact (ft. lbs./in. notch) | 6.9 |
| Elongation to failure (percent) | 35.2 |
| Tensile yield strength (p.s.i.) | 7700 |
| Tensile ultimate strength (p.s.i.) | 7000 |

EXAMPLE 9

The following formulation is blended and molded:

| Material | Parts by weight |
|---|---|
| Poly(2,6-dimethyl - 1,4 - phenylene) ether (as in Example 1) | 40 |
| High impact rubber modified polystyrene (as in Example 6) | 20 |
| 50/50 interpolymer of butadiene and styrene (as in Example 6) | 40 |

The composition is molded into test specimens and the following physical properties are obtained:

| | |
|---|---|
| Izod impact (ft. lbs./in. notch) | 7.7 |
| Elongation to failure (percent) | 32.9 |
| Tensile yield strength (p.s.i.) | 6900 |
| Tensile ultimate strength (p.s.i.) | 6600 |

EXAMPLE 10

The following formulation is blended and molded:

| Material | Parts by weight |
|---|---|
| Poly(2,6-dimethyl - 1,4 - phenylene) ether (as in Example 1) | 40 |
| High impact rubber modified polystyrene (as in Example 6) | 10 |
| 50/50 interpolymer of butadiene and styrene (as in Example 6) | 50 |

The composition is molded into test specimens and the following physical properties are obtained.

| | |
|---|---|
| Izod impact (ft. lbs./in. notch) | 7.9 |
| Elongation to failure (percent) | 34 |
| Tensile yield strength (p.s.i.) | 6600 |
| Tensile ultimate strength (p.s.i.) | 6400 |

For comparison purposes two formulations are made, one of which (Z), contains less than 85% of <0.5 micron particles, and the other of which (AA) contains greater than 85% of <0.5 micron particles.

| | Parts by weight of— | |
|---|---|---|
| Material | Z | AA |
| Poly(2,6-dimethyl-1,4-phenylene) ether (as in Example 1) | 40 | 40 |
| High impact rubber modified polystyrene (as in Example 6) | 60 | |
| 50/50 interpolymer of butadiene and styrene (as in Example 6) | | 60 |

The compositions are molded into test specimens and the following physical properties are obtained:

| | Z | AA |
|---|---|---|
| Izod impact (ft. lbs./in. notch) | 1.9 | 7.2 |
| Elongation to failure (percent) | 36.6 | 33.8 |
| Tensile yield strength (p.s.i.) | 10,000 | 6,400 |
| Tensile ultimate strength (p.s.i.) | 8,300 | 6,200 |

The Izod impact data obtained from the comparison products, together with those from Examples 1–5 (products according to this invention) show that the compositions of this invention have a greater impact strength then would be expected based on the impact resistance of polyphenylene ether blends with either high impact polystyrene or 50/50 interpolymerized diene rubber and styrene separately.

Although the rubber content of the compositions of the above Examples 6 to 10 increases from 9 through 26% by weight, surface appearance, i.e., gloss, and processability is unexpectedly good. even at higher rubber levels.

Obviously, other modifications can be made in the present compositions. For example, the procedure of Example 4 can be repeated, substituting for the interpolymer of rubbery compolymer of butadiene and styrene with styrene and methyl methacrylate, an interpolymer of a rubbery butadiene-styrene copolymer and cografted styrene-ethyl acrylate (85–15). Compositions according to this invention are obtained.

In addition, the following polyphenylene ethers can be substituted for poly(2,6-dimethyl-1,4-phenylene)ether in the formulation of Example 1:

poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether
poly(2-ethyl-6-propyl-1,4-phenylene)ether.

Compositions according to this invention will be obtained.

The following polystyrene resins can be substituted for the crystal homopolystyrene in the formulations of Example 1:

poly-α-methylstyrene;
styrene-acrylonitrile copolymer (27% ACN);
styrene-α-methylstyrene copolymer;
styrene-methyl methacrylate copolymer;
poly-α-chlorostyrene; and
styrene-acrylonitrile-α-methylstyrene terpolymer.

Compositions according to this invention will be obtained.

Obviously, other modifications and variations of the present invention are possible in the light of the above teachings. It is, therefore, to be understood that changes may be made in the particular embodiments of the invention described which are within the full intended scope of the invention as defined by the appended claims.

We claim:

1. A high impact strength thermoplastic composition comprising, in combination,
   (a) a polyphenylene ether resin,
   (b) a polystyrene resin and
   (c) from about 5 to about 25% by weight of an interpolymer of from about 30 to about 70 parts by weight of a diene rubber with from about 70 to about 30 parts by weight of a vinyl aromatic compound or a mixture of a vinyl aromatic compound and an alkyl acrylic ester, the composition having a dispersed elastomeric phase with particle size of at least about 0.05 micron, from about 85 to 100% of the number of particles being about 0.5 micron or less in size and from 0 to about 15% of the number of particles being greater than about 0.5 micron in size.

2. A composition as defined in claim 1 wherein, in said elastomeric phase, from about 90 to 100% of the number of particles are from 0.05 to 0.5 micron in size and from 0 to 10% of the number of particles are from greater than 0.5 to 20 microns in size.

3. A composition as defined in claim 1 wherein, in said elastomeric phase, from about 98 to 100% of the particles are from 0.05 to 0.5 micron in size and from 0 to about 2% of the number of particles are from greater than 0.5 to 20 microns in size.

4. A composition as defined in claim 1 wherein said polystyrene resin is a crystal homopolystyrene.

5. A composition as defined in claim 1 wherein said polystyrene resin is a rubber modified high impact polystyrene resin.

6. A composition as defined in claim 5 wherein said rubber modified polystyrene is a bulk or suspension polymerization product of about 88 to 96 parts of styrene monomer with about 12 to 4 parts by weight of a diene rubber.

7. A composition as defined in claim 6 wherein said diene rubber comprises a member selected from the group consisting of polybutadiene, a rubbery copolymer of butadiene and styrene or a mixture thereof.

8. A composition as defined in claim 1 wherein, in said interpolymer (c), said vinyl aromatic compound is styrene and said mixture comprises styrene and up to about 33% of methyl methacrylate, based on the weight of styrene and methyl methacrylate.

9. A composition as defined in claim 1 wherein said interpolymer component (c) comprises a polystyrene grafted diene elastomer.

10. A composition as defined in claim 9 wherein said interpolymer includes a minor proportion of up to 50% by weight of ungrafted polystyrene.

11. A composition as defined in claim 1 wherein said interpolymer component (c) comprises an emulsion polymerization product of styrene monomer and a diene elastomer.

12. A composition as defined in claim 1 wherein said polystyrene component (b) comprises crystal homopolystyrene or a bulk or suspension polymerization product of about 88 to 96 parts by weight of styrene monomer with about 12 to 4 parts by weight of a diene rubber, said bulk or suspension polymerization product providing a dispersed elastomeric phase with particle size of at least about 0.05 micron, from 0 to about 75% of the number of particles being about 0.5 micron or less in size and from about 25 to 100% of the particles being greater than about 0.5 micron in size and said interpolymer component (c) comprises an emulsion polymerization product of about 30 to 70 parts by weight of diene rubber with about 70 to 30 parts by weight of a styrene monomer, said emulsion polymerization product providing a dispersed elastomeric phase with particle size of at least about 0.05 micron, from 85 to 100% of the number of particles being about 0.5 micron or less in size and from 0 to about 15% of the particles being greater than about 0.5 micron in size.

13. A composition as defined in claim 1 wherein said polystyrene, on a rubber-free basis, comprises from 20 to 80% by weight of the combined weight of said polystyrene, on a rubber-free basis, and said polyphenylene ether resin.

14. A composition as defined in claim 13 wherein said polystyrene, on a rubber-free basis, comprises from 40 to 60% by weight of the combined weight of said polystyrene, on a rubber-free basis, and said polyphenylene ether resin.

15. A composition as defined in claim 1 wherein said polyphenylene ether has the repeating structural formula

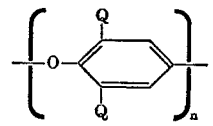

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

16. A composition as defined in claim 15 wherein Q is alkyl having from 1 to 4 carbon atoms.

17. A composition as defined in claim 16 wherein Q is methyl.

References Cited

UNITED STATES PATENTS

| | | | |
|---|---|---|---|
| 3,018,268 | 1/1962 | Daly | 260—676 R |
| 3,383,435 | 5/1968 | Cizek | 260—876 |
| 3,398,214 | 8/1968 | Roper | 260—876 |
| 3,644,227 | 2/1972 | Factor | 260—876 |

MURRAY TILLMAN, Primary Examiner

J. ZIEGLER, Assistant Examiner

U.S. Cl. X.R.

260—4 AR, 29.7 NR, 859 R, 874, 878 R, 880 R, 881, 895, 896, 901